United States Patent [19]
Asanuma et al.

[11] Patent Number: 5,548,007
[45] Date of Patent: Aug. 20, 1996

[54] RADIATION-RESISTANT POLYPROPYLENE RESIN COMPOSITION

[75] Inventors: Tadashi Asanuma; Shigeru Kimura; Nobutaka Uchikawa, all of Takaishi; Tetsunosuke Shiomura, Tokyo, all of Japan

[73] Assignee: Mitsui Toatsu Chemicals, Inc., Tokyo, Japan

[21] Appl. No.: 400,449

[22] Filed: Mar. 7, 1995

Related U.S. Application Data

[60] Continuation of Ser. No. 215,251, Mar. 21, 1994, abandoned, which is a division of Ser. No. 74,161, Jun. 9, 1993, Pat. No. 5,340,848, which is a continuation of Ser. No. 617,154, Nov. 23, 1990, abandoned.

[30] Foreign Application Priority Data

Dec. 6, 1989 [JP] Japan ............................. 315141
Feb. 19, 1990 [JP] Japan ............................. 036178

[51] Int. Cl.$^6$ ............................................. C08K 5/34
[52] U.S. Cl. ..................... 524/99; 524/127; 524/128; 524/287; 524/379; 526/351
[58] Field of Search ................... 524/99, 127, 128, 524/287, 379; 526/351

[56] References Cited

U.S. PATENT DOCUMENTS

| | | | |
|---|---|---|---|
| 3,759,926 | 9/1973 | Chalmers et al. | 260/293.9 |
| 3,940,325 | 2/1976 | Hirao | 204/159.2 |
| 4,056,507 | 11/1977 | Ramey et al. | 260/45.8 N |
| 4,507,415 | 3/1985 | Kasai et al. | 524/101 |
| 4,892,851 | 1/1990 | Ewen et al. | 502/104 |
| 5,023,286 | 6/1991 | Abe et al. | 524/128 |

FOREIGN PATENT DOCUMENTS

| | | |
|---|---|---|
| 0068555 | 1/1983 | European Pat. Off. |
| 0248545 | 12/1987 | European Pat. Off. |

*Primary Examiner*—David W. Wu
*Attorney, Agent, or Firm*—Burns, Doane, Swecker & Mathis

[57] ABSTRACT

A radiation-resistant polypropylene resin composition is disclosed which comprises a polypropylene having a substantially syndiotactic structure, and if desired, a phosphorus-containing anti-oxidant, an amine-containing anti-oxidant and/or a nucleating agent. Molded articles obtained from this resin composition can be utilized as containers for foods and medicines, and their physical properties scarcely deteriorate during sterilization by radiation.

8 Claims, No Drawings

RADIATION-RESISTANT POLYPROPYLENE RESIN COMPOSITION

This application is a continuation of application Ser. No. 08/215,251, filed Mar. 21, 1994, now abandoned, which is a divisional of application Ser. No. 08/074,161, filed on Jun. 9, 1993, now U.S. Pat. No. 5,340,848, which is a continuation of application Ser. No. 07/617,154, filed on Nov. 23, 1990, now abandoned.

BACKGROUND OF THE INVENTION

1. Field of the Invention

The present invention relates to a resin composition comprising a polypropylene having a substantially syndiotactic structure, and more specifically, it relates to a polypropylene resin composition whose physical properties are scarcely deteriorated by radiation.

2. Description of the Prior Art

Polypropylene is inexpensive and has relatively suitably balanced physical properties, and therefore it is now used as materials for containers and packages of foods and medicines. In using polypropylene for these purposes, it is necessary to sterilize the containers and packages, and for this intention, irradiation is effected. The sterilization by the use of the radiation is easy but causes a decrease in the molecular weight and the deterioration of physical properties of the polymer.

A syndiotactic polypropylene has been known for a long period of time. Although such a polypropylene is prepared by polymerization at a low temperature in the presence of a conventional catalyst comprising a vanadium compound, an ether and an organic aluminum compound, the thus prepared syndiotactic polypropylene is poor in syndiotacticity and has characteristics like an elastomer. Thus, it is not considered that the polypropylene has syndiotactic characteristics.

A polypropylene having good tacticity, i.e., a syndiotactic pentad fraction of more than 0.7 in accordance with $^{13}$C-NMR has been discovered for the first time by J. A. Ewen et al. which can be obtained by polymerizing propylene in the presence of a polymerization catalyst comprising compounds of transition metals (Hf and Zr) having an asymmetric ligand and methyl aluminoxane (J. Amer. Chem. Soc., 110, 6255–6256, 1988).

In the J. A. Ewen et al. method described above, the activity of the transition metal is high, and the obtained syndiotactic polypropylene is excellent in syndiotacticity and physical properties inclusive of impact resistance. Therefore, this kind of syndiotactic polypropylene is on such a level as to be sufficiently utilizable in uses of a conventional isotactic polypropylene.

In recent years, the uses of polypropylene which require sterilization has increased, and the development of polypropylene is desired in which physical properties scarcely are deteriorated at the time of the sterilization by the radiation and which has an excellent balance of physical properties.

SUMMARY OF THE INVENTION

An object of the present invention is to provide a resin composition comprising a polypropylene which is stable to radiation and which has an excellent balance of physical properties.

Other objects of the present invention will be elucidated from the following description of the invention.

A radiation-resistant polypropylene resin composition of the present invention comprises a polypropylene having a substantially syndiotactic structure in which in the absorption spectrum of $^{13}$C-NMR measured in a 1,2,4-trichlorobenzene solution, a peak intensity at about 20.2 ppm on the basis of tetramethylsilane occupies 0.5 or more of the total intensity of peaks attributed to methyl groups of the propylene units.

DESCRIPTION OF THE PREFERRED EMBODIMENTS

In the present invention, polypropylenes having a substantially syndiotactic structure include a homopolymer of propylene having the substantially syndiotactic structure with the above-mentioned $^{13}$C-NMR absorption spectrum characteristics and a copolymer of propylene and another α-olefin having 2 to 25 carbon atoms having the substantially syndiotactic structure with above-mentioned $^{13}$C-NMR absorption spectrum characteristics. Examples of the α-olefin other than propylene include ethylene and compounds represented by the formula $CH_2=CH-R$ (wherein R is an alkyl group having 2 to 18 carbon atoms, preferably 2 to 12 carbon atoms which may branch). Typical examples of these compounds include straight-chain olefins such as butene-1, pentene-1, hexene-1, heptene-1, octene-1, nonene-1, decene-1, undecene-1, dodecene-1, tridecene-1, pentadecene-1, hexadecene-1, heptadecene-1 and octadecene-1, and branched olefins such as 3-methylbutene-1, 4-methylpentene-1 and 4,4-dimethylpentene-1. The amount of the α-olefin is usually about 20% by weight or less, preferably 15% by weight or less from the viewpoint of stiffness.

The polypropylene having the substantially syndiotactic structure can be prepared by the above-mentioned J. A. Ewen et al. method. In this case, any catalyst which is different from the Ewen et al. catalyst can also be employed herein, so long as it can provide the syndiotactic propylene homopolymer having a syndiotactic pentad fraction of more than 0.7 when propylene is singly polymerized.

The method using the above-mentioned catalyst can be applied to the manufacture of the copolymer of the polypropylene and another olefin.

The process wherein a polymerization catalyst comprising a transition metal compound having an asymmetric ligand and aluminoxane is used can provide a syndiotactic polypropylene having relatively good tacticity. Examples of the transition metal compound having the asymmetric ligand include isopropyl(cyclopentadienyl-1-fluorenyl)hafnium dichloride, isopropyl-(cyclopentadienyl-1-fluorenyl)zirconium dichloride, and those compounds in which one or two of the chlorine atoms are replaced with other halogens or alkyl groups each having 1 to 5 carbon atoms.

Examples of the aluminoxane include compounds represented by the formula

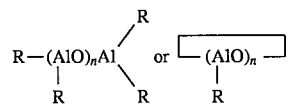

(wherein R is a hydrocarbon residue having 1 to 3 carbon atoms). In particular, what is suitably used is an aluminoxane in which R is a methyl group and n is 5 or more, preferably from 10 to 100.

The amount of the aluminoxane to be used is from 10 to 1,000,000 mole times, preferably from 50 to 5,000 mole times as much as that of the transition metal compound.

No particular restriction is put on the polymerization conditions, and various known polymerization techniques are utilizable such as solvent polymerization using an inert solvent, bulk polymerization in which substantially no inert solvent is used, and gas phase polymerization. Usually, the polymerization temperature is from $-100°$ to $200°$ C. and the polymerization pressure is from atmospheric pressure to 100 $kg/cm^2$-G, and preferably, the temperature is from $-100°$ to $100°$ C. and the pressure is from atmospheric pressure to 50 $kg/cm^2$-G.

In order to further heighten the syndiotacticity fraction of the thus obtained polypropylene, it is effective to wash the obtained polypropylene with a hydrocarbon solvent having 3 to 20 carbon atoms. Examples of the hydrocarbon solvent include propylene itself; saturated hydrocarbon compounds such as propane, butane, pentane, hexane, heptane, octane and nonane; aromatic hydrocarbon compounds such as benzene, toluene, xylene and ethylbenzene; and those compounds in which a part or all of hydrogen atoms are replaced with fluorine, chlorine, bromine or iodine. Examples of other usable solvents include alcohols having 1 to 20 carbon atoms, ethers having 2 to 20 carbon atoms and esters which can dissolve or disperse a low-molecular atactic component therein. No particular restriction is put on the washing method, but the washing is usually carried out at a temperature of from 0 to $100°$ C.

As a result of the above-mentioned washing treatment, a syndiotactic polypropylene having excellent physical properties can be obtained in which an n-hexane-soluble portion is limited and the surfaces of molded articles thereof are prevented from becoming sticky.

In the propylene homopolymer which can be obtained by the above-mentioned process, its syndiotactic pentad fraction (which is observed at about 20.2 ppm on the basis of tetramethylsilane in $^{13}$C-NMR measured in a 1,2,4-trichlorobenzene solution, and the same shall apply hereinafter) as the tacticity is 0.7 or more, preferably 0.8 or more. When the syndiotactic pentad fraction is less than 0.7, characteristics inherent in the crystalline polypropylene itself are insufficient, and physical properties are also inconveniently poor.

Furthermore, it is favorable for the above-mentioned polypropylene homopolymer that its hexane-soluble portion at $20°$ C. is 10% by weight or less. This hexane-soluble portion can be calculated as follows: 10 g of the powdery polymer is dispersed in 100 ml of hexane at $20°$ C., followed by stirring for 5 hours. Then, the solution is extracted, and the resultant extract is weighed. The hexane-soluble portion is obtained by dividing the amount of the extract by that of the polymer prior to the extraction. When this soluble portion is in excess of 10% by weight, the surfaces of molded articles of the polypropylene are inconveniently sticky. For this reason, the amount of the hexane-soluble portion is preferably 5% by weight or less.

The above-mentioned copolymer of propylene and the other α-olefin has the highly syndiotactic structure in which in the absorption spectrum of $^{13}$C-NMR measured in a 1,2,4-trichlorobenzene solution, a peak intensity at about 20.2 ppm on the basis of tetramethylsilane occupies 0.5 or more of the total intensity of peaks attributed to methyl groups of the propylene units.

The molecular weight of the polypropylene having the substantially syndiotactic structure which constitutes the resin composition of the present invention is preferably from 0.1 to 10 in terms of an intrinsic viscosity measured in a tetralin solution at $135°$ C. Moreover, when the molecular weight distribution of the polypropylene measured through gel permeation chromatography is relatively narrow, the polypropylene is more stable to radiation, in other words, it is scarcely decomposed thereby. In the present invention, the ratio of the weight average molecular weight to the number average molecular weight (Mw/Mn) of the polypropylene is preferably from 1.5 to 5, more preferably from 1.5 to 4. This Mw/Mn ratio can be measured in a 1,2,4-trichlorobenzene solution at $135°$ C. by the use of a commercially available column.

In the present invention, it is preferable to add a phosphorus- or amine-containing anti-oxidant to the polypropylene having the syndiotactic structure. The addition of the anti-oxidant permits effectively avoiding the deterioration of physical properties at the time of molding or radiation sterilization.

Many anti-oxidants are already known, but examples of the anti-oxidants which can be used in the present invention include phosphorus-containing anti-oxidants such as trialkyl phosphites (wherein the alkyl group is isodecyl, tridecyl and the like), phenyldialkyl phosphites (wherein the alkyl group is isodecyl, isooctyl and the like), diphenylalkyl phosphites (wherein the alkyl group is isodecyl, isooctyl, isodecyl and the like), triphenyl phosphite, substituted triphenyl phosphites, phosphorous acid (1,1-biphenyl-4,4'-diylbistetrakis(2,4-bis(1,1'-dimethylethyl)phenyl) ester, 3,5-di-tert-butyl-4-hydroxybenzyl phosphate-diethyl ester, 9,10-dihydro-9-oxa-10-phosphaphenanthrene-10-oxide, sodium bis(4-tertbutylphenyl) phosphate, sodium 2,2'-methylene-bis(4,6-di-tert-butylphenyl) phosphate and 1,3-bis(diphenoxyphosphonyloxy)benzene.

Examples of the amine-containing anti-oxidants include alkyl-substituted diphenylamines, unsubstituted and N-substituted diallyl-p-phenylenediamines, a substituted quinoline such as 6-ethoxy-2,2',4-trimethyl-1,2-dihydroquinoline, and a substituted piperidine such as 2,2',6,6'-tetraalkylpiperidine.

The amount of the anti-oxidant to be added is usually from 0.01 to 1% by weight, preferably.0.05 to 0.5% by weight with respect to the weight of the resin composition.

In the present invention, a nucleating agent can be added to the polypropylene having the syndiotactic structure which meets the above-mentioned requirements.

Any known nucleating agent can be used in the present invention, and examples of the nucleating agent include metallic salts of aromatic monocarboxylic acids such as benzoic acid, toluic acid and p-tert-butylbenzoic acid; dibenzylidene sorbitols such as 1,3-2,4-di(benzylidene) sorbitol, 1,3.2,4-di(p-methylbenzylidene) sorbitol and 1,3.2,4-di(p-ethylbenzylidene) sorbitol; metallic salts of aromatic phosphoric compounds such as sodium bis(4-tert-butylphenyl) phosphate and sodium methylene-bis(2,4-di-tert-butylphenol) phosphate; polymers having high melting points such as polyvinylcyclohexane, poly-3-methylbutene, crystalline polystyrene and polytrimethylvinylsilane; quinacridones such as 2,3-quinacridone, dihydroxyquinacridone and acetylated quinacridone; and inorganic compounds such as talc, kaolin and mica. These nucleating agents may be used singly or in combination. The amount of the nucleating agent to be used is usually from 0.001 to 1% by weight, preferably from 0.1 to 0.5% by weight with respect to the weight of the resin composition.

The polypropylene resin composition of the present invention fundamentally comprises the polypropylene having the syndiotactic structure, but if desired, it may further contain a polypropylene having an isotactic structure, a copolymer of propylene and ethylene or α-olefin having 4 or more carbon atoms, or another polyolefin. The amount of this additional polymer is less than 50% by weight, preferably less than 40% by weight of the resultant resin composition, and in other words, the amount should be such as not to impair the radiation resistance. In the above-mentioned additional polymer having the isotactic structure, an isotactic pentad fraction measured by $^{13}$C-NMR is preferably 0.9 or more.

The resin composition of the present invention may contain one or a combination of a lubricant, an ultraviolet absorber, an ultraviolet stabilizer, a thermal stabilizer, an antistatic agent and an organic and inorganic pigment in such an amount as not to impair the effect of the present invention noticeably. Typical examples of these additives are those which are usually added to a polyolefin resin.

No particular restriction is put on the preparation process of the resin composition regarding the present invention, and the resin composition can be prepared by mixing, with other constitutional components, the polypropylene having the syndiotactic structure. This mixing can usually be achieved at a temperature of the melting point of the polypropylene or less in a mixer such as a Henschel mixer. Generally, the resultant mixture is melted and extruded by an extruder into pellets.

The resin composition of the present invention can be preferably utilized as molded articles such as various containers for foods and medicines which will be subjected to radiation sterilization prior to use. The molding of the containers can be achieved by a known technique such as injection molding, extrusion or blow molding.

After the molding step, these containers can be sterilized by irradiating them with radiation such as gamma rays or electron beams. The sterilization can usually be achieved by irradiating with a radiation dose of 10 Mrad or less, preferably from 1 to 5 Mrad. No particular restriction is put on the irradiation manner, but when gamma rays which have Strong permeability are used, the irradiation of a great dose for a short irradiation time is preferable to minimize the deterioration of physical properties of the containers to be sterilized. On the other hand, in case the electron beams which have weak permeability are used, it is necessary that each relatively thin molded article having a thickness of several millimeters is disposed perpendicularly to the electron beams when irradiated. No particular restriction is put on the temperature at the time of the irradiation, but the irradiation can be carried out preferably at ambient temperature.

The resin composition of the present invention is excellent in thermal stability when molded, and the molded articles obtained therefrom are excellent in radiation resistance and the balance of physical properties. Therefore, the resin composition of the present case is extremely useful in the fields of foods and medicines which will be subjected to radiation sterilization.

Now, the present invention will be described in more detail in reference to examples.

Example 1

In a 200-liter autoclave, propylene was polymerized at 20° C. under a polymerization pressure of 3 kg/cm$^2$-G for 2 hours in the presence of 100 liters of toluene by the use of 0.2 g of isopropyl(cyclopentadienyl-1-fluorenyl)zirconium dichloride and 30 g of methylaluminoxane made by Toso Akzo Co., Ltd. having a polymerization degree of about 16.1 as catalysts. The above isopropyl(cyclopentadienyl-1-fluorenyl)zirconium dichloride had been prepared by converting into lithium salt of isopropylcyclopentadienyl-1-fluorene synthesized in a conventional manner and then reacting the same with zirconium tetrachloride to effect recrystallization.

After completion of the polymerization, the unreacted propylene was purged, and the resultant polymer was then washed with 25 liters of methanol and 0.25 liter of methyl acetate in order to remove catalyst residue and further washed with a 1N aqueous hydrochloric acid solution, followed by filtering, thereby obtaining 5.6 kg of syndiotactic polypropylene.

The thus obtained polypropylene had a syndiotactic pentad fraction of 0.935, an intrinsic viscosity (hereinafter referred to simply as "$\eta$") of 1.45 as measured in a tetralin solution at 135° C., and Mw/Mn of 2.2 as measured in 1,2,4-trichlorobenzene.

This polypropylene had a soluble portion of 2% by weight, when 10 g of the polypropylene were dispersed in 100 ml of n-hexane at 20° C., and then stirred for 5 hours. The polypropylene was then irradiated with 3 Mrad of gamma rays at 30° C. at 2 Mrad/hour, and as a result, $\eta$ became 1.26.

To this polypropylene were added 0.1% by weight of tris(2,4-di-tert-butylphenyl) phosphite and 0.01% by weight of dimethyl succinate-1-(2-hydroxyethyl)-4-hydroxy-2,2,6,6-tetramethylpiperidine polycondensate, and pellets were then formed. From these pellets, a sheet having a thickness of 2 mm was made and then irradiated with 3 Mrad of gamma rays. Afterward, physical properties were measured in the following manner.

Flexural stiffness: kg/cm$^2$ ASTM D-747 (23° C.)

Tensile yield strength: kg/cm$^2$ ASTM D-638 (23° C.)

Elongation at breakage: % ASTM D-638 (23° C.)

Izod impact strength (notched): kg-cm/cm ASTM D-638 (23° C. −10° C.)

The flexural stiffness, the tensile yield strength, the elongation at breakage and the Izod impact strength (23° C., −10° C.) before the irradiation were 6,200, 260, 550, and 45 and 3.6, respectively, and after the irradiation, they were 6,100, 265, 390, and 38 and 3.4.

Comparative Example 1

The same procedure as in Example 1 was effected except for the employment of a commercially available isotactic propylene-ethylene copolymer in which the ethylene content was 4.2% by weight, an isotactic pentad fraction measured by $^{13}$C-NMR was 0.928, $\eta$ was 1.50 and Mw/Mn was 5.8. When the stabilizing agent in Example 1 was not added, $\eta$ after irradiation was 1.18. Furthermore, with respect to physical properties before the irradiation, flexural stiffness, tensile yield strength, elongation at breakage and Izod impact strength (23° C., −10° C.) were 5,800, 250, 570, and 3.5 and 1.5, respectively, and after the irradiation, they were 5,700, 240, 110, and 2.8 and 1.0, respectively.

Comparative Example 2

The same amount of the same stabilizing agent as in Example 1 was added to a commercially available isotactic propylene homopolymer in which an isotactic pentad fraction was 0.945, $\eta$ was 1.62 and Mw/Mn was 6.2, and pellets were then formed therefrom. Afterward, a sheet having a thickness of 2 mm was made from the pellets. In the same manner as in Example 1, the sheet was irradiated with gamma radiation, and physical properties of the sheet were then measured before and after the irradiation.

With respect to physical properties before the irradiation, flexural stiffness, tensile yield strength, elongation at breakage and Izod impact strength (23° C., −10° C.) were 13,000, 350, 600, and 2 and 1 or less, respectively, and after the irradiation, they were 8,500, 310, 85, and 1 or less and 1 or less, respectively.

Example 2

Polymerization was effected by the same procedure as in Example 1 except that 10 liters of hexene-1 were used. Unreacted propylene was purged from the polymerization mixture, and this polymerization mixture was then transferred to a 500-liter autoclave. Afterward, 200 liters of methanol were added thereto so as to precipitate a polymer. The thus obtained polymer was a propylene-hexene-1 copolymer in which the content of hexene-1 units was 5.6% by weight, a peak intensity at 20.2 ppm by $^{13}$C-NMR occupied 0.69 of the total peak intensity attributed to the methyl groups in the propylene units, η was 1.24, and Mw/Mn was 2.2.

In the same manner as in Example 1, physical properties of the polymer were measured before and after the irradiation. As a result, flexural stiffness, tensile yield strength, elongation at breakage and Izod impact strength (23° C., −10° C.) before the irradiation were 5,200, 220, 480, and 13.5 and 3.5, respectively, and after the irradiation, they were 5,200, 210, 380, and 12.8 and 3.5, respectively. In addition, η was 1.24 before the irradiation and 1.20 after the irradiation, and thus the deterioration of η was scarcely perceived.

Example 3

The same operation as in Example 1 was carried out except that ethylene was continuously fed at 200 g/hour during polymerization, in order to obtain a propylene-ethylene copolymer in which the content of ethylene units was 2.5% by weight, a peak intensity at 20.2 ppm by $^{13}$C-NMR occupied 0.83 of the total peak intensity attributed to the methyl groups in the propylene units, η was 1.38, and Mw/Mn was 2.1.

In the same manner as in Example 1, physical properties of the polymer were measured before and after the irradiation. As a result, flexural stiffness, tensile yield strength, elongation at breakage and Izod impact strength (23° C., −10° C.) before the irradiation were 5,600, 240, 680, and 14.5 and 2.9, respectively, and after the irradiation, they were 5,700, 250, 670, and 14.6 and 2.8, respectively. In addition, η was 1.38 before the irradiation and 1.32 after the irradiation, and thus the deterioration of η was scarcely perceived.

Example 4

The same procedure as in Example 1 was effected except that the syndiotactic polypropylene of Example 1 and the isotactic propylene-ethylene copolymer of Comparative Example 1 were used in a mixture in a weight ratio of 7:3. In the resultant polymer, a peak intensity at 20.2 ppm by $^{13}$C-NMR occupied 0.65 of the total peak intensity attributed to the methyl groups in the propylene units.

With regard to physical properties of the polymer, flexural stiffness, tensile yield strength, elongation at breakage and Izod impact strength (23° C., −10° C.) before the irradiation were 6,000, 260, 680, and 12.2 and 2.8, respectively, and after the irradiation, they were 6,100, 255, 490, and 14.2 and 2.6, respectively. In addition, η was 1.46 before the irradiation and 1.33 after the irradiation, and thus the deterioration of η was scarcely perceived.

What is claimed is:

1. A radiation-resistant polypropylene resin composition suitable for the preparation of molded articles in which physical properties scarcely deteriorate during sterilization by radiation, which comprises a propylene homopolymer having a syndiotactic pentad fraction of 0.7 or more, or a copolymer of propylene and an α-olefin other than propylene having 2 to 25 carbon atoms in which in the absorption spectrum of $^{13}$C-NMR measured in a 1,2,4-trichlorobenzene solution, a peak intensity at about 20.2 ppm on the basis of tetramethylsilane occupies 0.5 or more of the total intensity of peaks attributed to methyl groups of propylene units, and at least one additive selected from the group consisting of a phosphorus-containing antioxidant, an amine-containing antioxidant and a nucleating agent.

2. The radiation-resistant polypropylene resin composition according to claim 1 wherein the amount of said antioxidant is in the range of from 0.01 to 1% by weight.

3. The resin composition according to claim 2, wherein the phosphorous-containing antioxidant is at least one member selected from the group consisting of trialkyl phosphites wherein the alkyl group is isodecyl or tridecyl, phenyl-dialkyl phosphites wherein the alkyl group is isodecyl or isooctyl, diphenylalkyl phosphites wherein the alkyl group is isooctyl or isodecyl, triphenyl phosphite, substituted triphenyl phosphites, phosphorous acid (1,1-biphenyl-4,4'-diyl-bistetrakis (2,4-bis(1,1'-dimethylethyl)phenyl) ester, 3,5-di-tert-butyl-4-hydroxybenzyl phosphate-diethyl ester, 9,10-dihydro-9-oxa-10-phosphaphenanthrene-10-oxide, sodium bis(4-tert-butylphenyl) phosphate, sodium 2,2'-methylene-bis(4,6-di-tert-butylphenyl) phosphate and 1,3-bis(diphenoxyphosphonyloxy)benzene.

4. The resin composition according to claim 2, wherein the amine-containing antioxidant is at least one member selected from the group consisting of alkyl-substituted diphenylamines, unsubstituted and N-substituted diallyl-p-phenylenediamines, 6-ethoxy-2,2'4-trimethyl-1,2-dihydroquinoline and 2,2',6 6'-tetraalkylpiperidine.

5. The radiation-resistant polypropylene resin composition according to claim 1 wherein the amount of said nucleating agent is in the range of from 0.001 to 1% by weight.

6. The resin composition according to claim 5, wherein the nucleating agent is at least one member selected from the group consisting of a metallic salt of benzoic acid, toluic acid or p-tert-butylbenzoic acid, 1,3.2,4-di(benzylidene) sorbitol, 1,3.2,4-di(p-methylbenzylidene) sorbitol, 1,3.2,4-di(p-ethylbenzylidene) sorbitol, sodium bis(4-tertbutylphenyl) phosphate, sodium methylene-bis(2,4-di-tertbutylphenol) phosphate; polyvinylcyclohexane, poly-3-methylbutene, crystalline polystyrene, polytrimethylvinylsilane, 2,3-quinacridone, dihydroxyquinacridone, acetylated quinacridone, talc, kaolin and mica.

7. The resin composition according to claim 1, wherein the propylene homopolymer has a syndiotactic pentad fraction of 0.8 or more and contains 10% by weight or less of an n-hexane soluble portion at 20° C., and the propylene copolymer comprises propylene and α-olefins having the formula CH$_2$=CHR wherein R is an alkyl group having 2 to 18 carbon atoms, the content of α-olefin units in the copolymer being 20% by weight or less.

8. The resin composition according to claim 1, wherein the α-olefin has 4 to 25 carbon atoms.

* * * * *